No. 659,951. Patented Oct. 16, 1900.
W. H. BAKER & F. E. KIP.
LOOM.
(Application filed Nov. 3, 1899.)
(No Model.) 3 Sheets—Sheet 2.
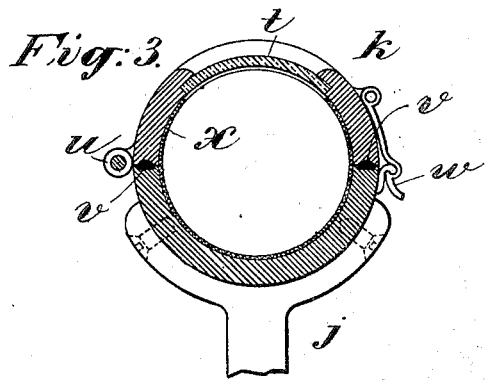
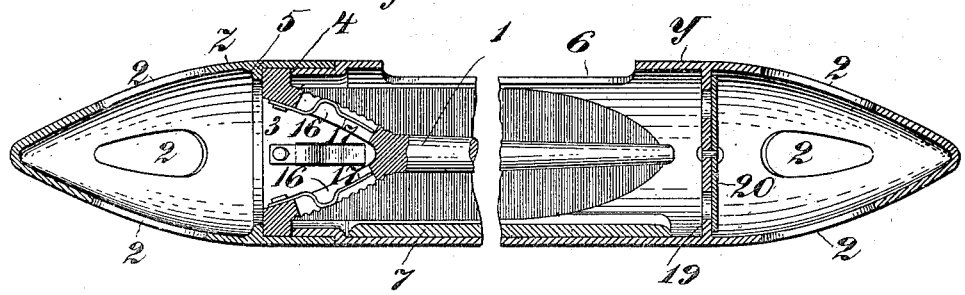
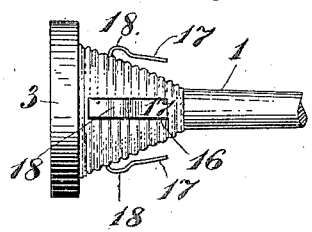
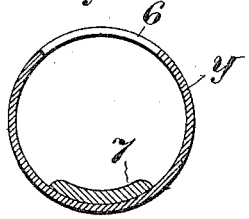
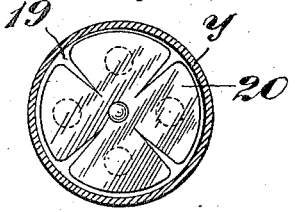
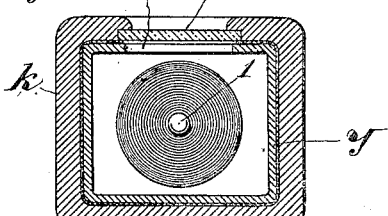
Witnesses
Inventors:
William H. Baker
Frederic E. Kip
By Their Attorney No. 659,951. Patented Oct. 16, 1900.
W. H. BAKER & F. E. KIP.
LOOM.
(Application filed Nov. 3, 1899.)
(No Model.) 3 Sheets—Sheet 3.
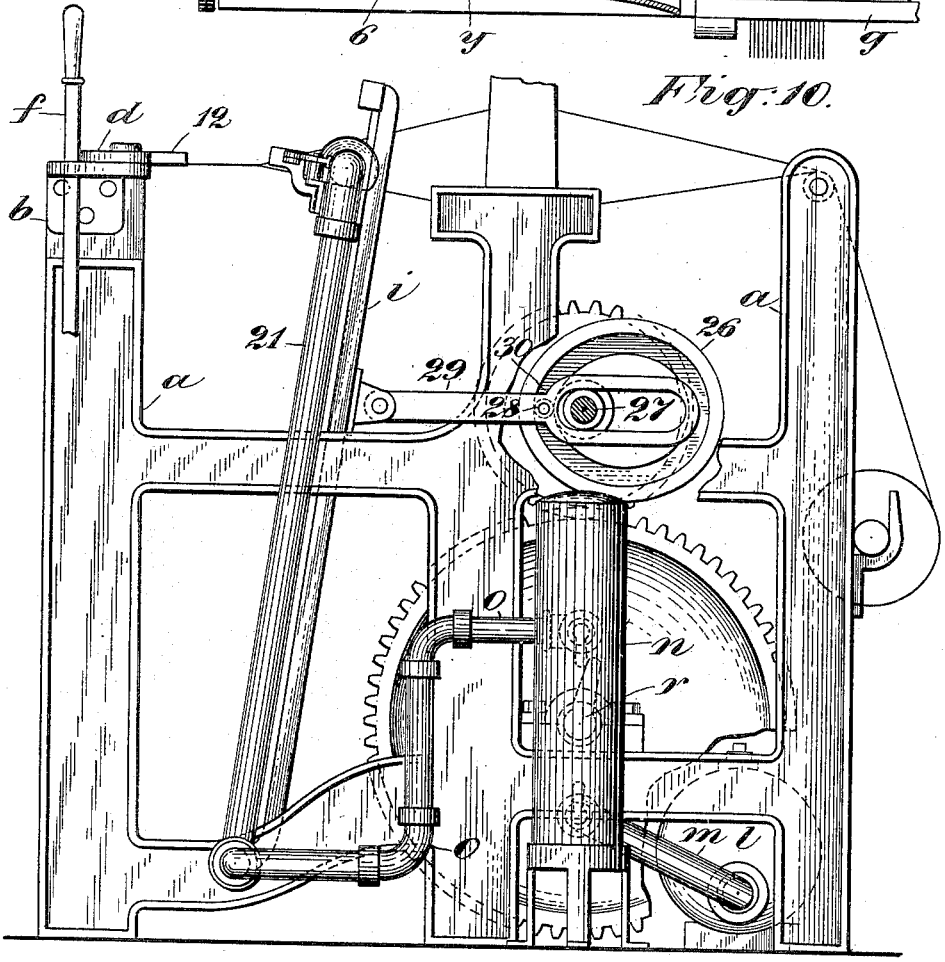

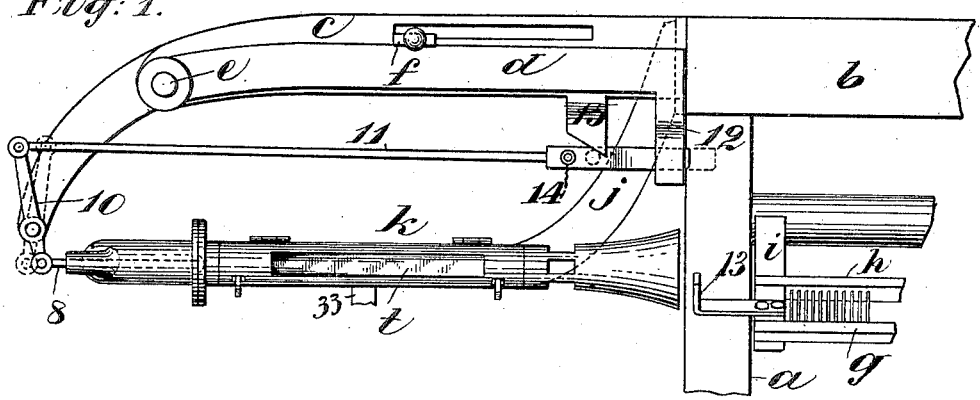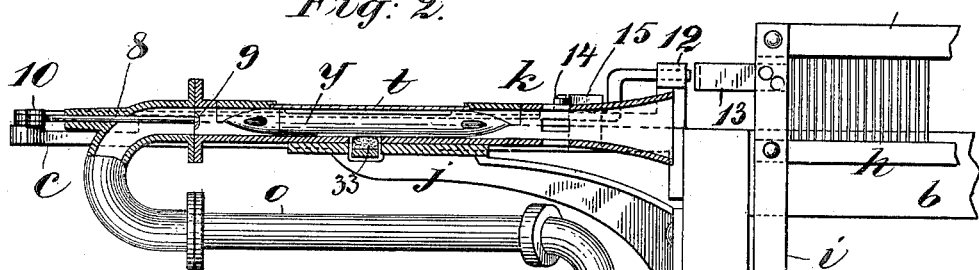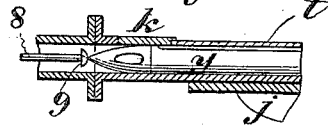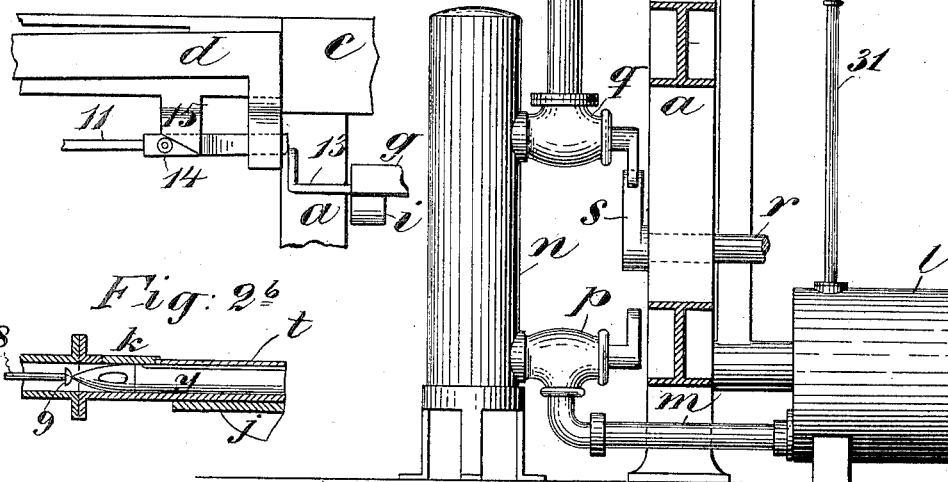

UNITED STATES PATENT OFFICE.

WILLIAM H. BAKER, OF CENTRAL FALLS, RHODE ISLAND, AND FREDERIC E. KIP, OF MONTCLAIR, NEW JERSEY.

LOOM.

SPECIFICATION forming part of Letters Patent No. 659,951, dated October 16, 1900.

Application filed November 3, 1899. Serial No. 735,648. (No model.)

*To all whom it may concern:*

Be it known that we, WILLIAM H. BAKER, residing at Central Falls, Providence county, Rhode Island, and FREDERIC E. KIP, residing at Montclair, Essex county, New Jersey, citizens of the United States, have invented certain new and useful Improvements in Looms, of which the following is a specification.

This invention relates to the class of looms such as that illustrated in our pending application, Serial No. 735,647, filed November 3, 1899, wherein a compressed aeriform fluid, as air, is employed for picking or driving the shuttle through the warp-shed; and one of the more important objects of the present invention is to provide means for automatically stopping the loom when the weft in the shuttle shall have become nearly or quite exhausted.

The invention also includes other features and improvements not shown in our former application, and these will be fully hereinafter described.

In the accompanying drawings, which illustrate embodiments of the invention, Figure 1 is a plan of a portion of a loom, showing the parts thereof wherein the loom-stopping mechanism is embodied. Fig. 2 is a rear view of the same parts, the shuttle-box being represented in section; and Fig. 2ª is a fragmentary plan view showing the parts in a different position from that seen in Fig. 1. Fig. 2ᵇ is an explanatory fragmentary sectional view. Fig. 3 is a cross-section of a cylindrical shuttle-box on a much larger scale than the principal views. Fig. 4 is a longitudinal vertical section of the shuttle broken away at the middle. Fig. 5 is a side view of the butt of the empty bobbin. Figs. 6 and 7 are cross-sections of the cylindrical shuttle. Fig. 8 is a cross-section of a shuttle and shuttle-box of rectangular form. Figs. 9 and 10 are views illustrating a construction wherein the shuttle-boxes vibrate with the reed or lay, Fig. 9 being a plan and Fig. 10 a side view.

Referring primarily to Figs. 1 and 2, $a$ is the loom-frame. $b$ is the breast-beam, forming a part thereof. $c$ is a bracket on the breast-beam. $d$ is the knock-off lever, pivotally mounted at $e$ on the bracket $c$; and $f$ is the shipper-lever, engaging a shoulder on the bracket and adapted to be freed for stopping the loom. These are known features in many looms. $g$ is the reed, and $h$ is a raceway. These are herein shown as carried by lay-swords $i$ and may be vibrated by cranks and connecting-rods in a known way. Mounted on a suitable bracket $j$ on the loom-frame is the non-vibrating shuttle-box $k$. In a general way this shuttle-box, which is situated at the picking-point, is elongated and tubular, has a flared receiving end, and apertures near the receiving end for the lateral escape of air; but the present box has or may have some details of construction which are to be hereinafter described. The devices for admitting compressed air to the shuttle-box in regulated quantity and at proper times comprise a holder $l$ for compressed air, a pipe $m$ to lead this air to a vessel $n$ to contain a measured charge of air for driving the shuttle, a pipe $o$, leading from said vessel to the outer end of the shuttle-box, self-closing valves $p$ and $q$, controlling the respective pipes $m$ and $o$, a cam-shaft $r$, and a cam $s$ on said shaft, adapted to open said valves alternately. These features are not specifically claimed herein, nor do we limit ourselves thereto, as other devices may be employed to furnish compressed air in regulated quantity for picking the shuttle.

The shuttle-box $k$, as herein shown, has in its top or crown an aperture closed with a plate $t$ of glass, mica, or other suitable transparent material, so that the weaver may inspect the interior of the box, and it may have its upper half or section hinged at $u$ (see Fig. 3) to the lower half, so that access can also be had to the interior of the box. When so constructed, the joints may have packing-strips $v$ of rubber or the like, and a suitable fastening device $w$ will be provided to hold the upper section closed. The box may have a lining $x$ (except over the plate $t$) of chamois, velvet, or the like, as described in our before-mentioned application.

The shuttle $y$ (seen best in Fig. 4) may be constructed similar to that described in our before-mentioned application—that is, it will be of the proper contour in cross-section to fit properly in the shuttle-box $k$—and may have a removable end piece $z$ to enable the bobbin $l$ to be inserted, and this end piece when in place may be secured by any form of fastening. There will be apertures 2 in the ends of the shuttle to admit air, and the head or butt piece 3 of the bobbin will be clamped firmly when in place between shoulders 4 and 5 on the shuttle-body and end piece, respectively. All of the above features are shown in our before-mentioned application; but in the present construction the shuttle has in its crown an aperture 6, which comes under the transparent plate $t$ when the shuttle enters the shuttle-box and permits the weaver to inspect the bobbin and note the condition of the weft thereon.

The shuttle illustrated in Figs. 3, 4, 6, and 7 is represented as cylindrical, and if made in this form it should be provided with a ballast 7 in the nature of a strip of lead, for example, at its bottom or low side to prevent the shuttle from turning axially while passing through the shed. Obviously, and in some cases preferably, the shuttle may be of rectangular cross-section, (the common form,) as seen in Fig. 8. We do not limit ourselves at all as to the cross-sectional contour of the shuttle and box.

The means whereby the exhaustion of the weft on the bobbin or weft-holder in the shuttle controls the loom stopping mechanism and the said mechanism will now be described.

In the outer end of the shuttle-box $k$ and alined therewith is mounted a slide-rod 8, which may have a head 9, Figs. 1, 2, and $2^a$, in the interior of the box and in the prolongation of the path of the entering shuttle. This rod is coupled exteriorly of the box to one arm of a lever 10, the other arm of which is coupled to a swing-rod 11, the free end of which has a sliding bearing in an arm or branch 12 on the knock-off lever $d$. Normally the shuttle $y$ enters the box $k$ only to the extent seen in Fig. 2, as the cushion in the box formed by the incarcerated air therein checks its momentum and arrests it; but when the weft on the bobbin is nearly exhausted this exhaustion of the weft opens a pasage-way through the shuttle for the incarcerated air by means that will be hereinafter explained. The resistance of the air to the entry of the shuttle into the box is thus reduced, and the shuttle entering farther into the box (see Fig. $2^b$) impinges on the head or end of the slide-rod 8 and drives this rod outward. This movement of the rod 8, acting through the lever 10, has the effect to move the swing-rod 11 endwise (see dotted lines in Fig. 1) until its head or free end is protruded into the path of a tappet 13 on a going part of the loom, as on the lay or reed, for example. When the lay next beats up, the tappet 13 impinges on this protruding end of the rod 11 and through it and the arm 12 shifts the knock-off lever $d$, frees the shipper-lever $f$, and allows the latter to stop the loom. As the rod 11 swings, however, under the influence of the tappet 13 a stud or stud-roller 14 thereon encounters the inclined face of a lug 15 on the bracket $c$ and draws in or back the rod 11, returning it to its normal or first position. This means of returning the rods 8 and 11 to their normal position is important, as it is not convenient in this construction to employ a spring for the purpose of retracting the parts.

Referring now to Figs. 4 to 7, the weft-control in the shuttle will be described. As before stated, the air can enter the shuttle at either end thereof through the apertures 2 therein; but the full bobbin or weft-holder acts as a partition between the apertures at the opposite ends of the shuttle and prevents the air from passing through it. However, when the weft is nearly exhausted from the bobbin a passage or passages are opened through the shuttle. This is done, as herein shown, by making the butt of the shuttle hollow and forming in its wall slots or apertures 16, (one or more,) these apertures being each provided with a flat spring closer 17, which normally or when the bobbin is nearly exhausted of weft springs outward, as seen in Fig. 5, by its own resiliency and opens the aperture 16; but when the weft is wound on the bobbin it presses in the springs, so that they practically close the apertures, as seen in Fig. 4. In order that the springs may open quickly during one pick of the shuttle, it is preferred to form a hump 18 on the spring for the weft to bear on, so that when the latter is removed from this hump the spring will be free to spring outward, as seen in Fig. 5. Some weft will still remain between this hump and the flanged butt of the bobbin, so that no defect will be produced in the cloth by the total exhaustion of the weft when the loom stops. There may be, of course, stop mechanism provided, such as that we have described, at each side of the loom; but it will suffice to apply it to one side of the loom. In this latter case the shuttle should be provided with a check-valve to prevent air from passing through the shuttle in but one direction. The shuttle in this case should always enter the box $k$, where the stop mechanism is situated, with that end thereof foremost which permits the air to pass back through the check-valve. The reason for this is fully explained in our pending application, Serial No. 735,647, filed November 3, 1899, and in Figs. 4 and 7 we have shown the same form of check-valve as that illustrated in our said pending application—that is to say, an apertured partition 19 in the shuttle and flexible valves 20, of rubber, soft leather, or the like, fixed to one face thereof.

Figs. 9 and 10 show a construction where the shuttle-box $k$ is mounted on and vibrates with the lay, and they show the air supplied to the box by a rocking or vibrating upright pipe 21, coupled at its upper end to the box and at its lower end to the pipe $o$, with an oscillating coupling axially alined with the swing-rail, which forms the center of vibration of the lay.

In the principal views the stopping mechanism is controlled by the tip of the entering shuttle driving back a rod 8 alined therewith; but we may as well employ a device substantially similar to that shown in our said pending application, Serial No. 735,647, wherein the shuttle acts with a wedging action. In this construction (illustrated in Fig. 9) there is a spring-arm 22, mounted in the shuttle-box, so as to be pressed or wedged outward by the incoming exhausted shuttle, and a beak on this spring, which plays through the wall of the shuttle-box, bears on one arm of an elbow-lever 23, mounted on the lay or box and provided with a retracting-spring 24. To the other arm of this lever is coupled a slide-rod 25, mounted in suitable guide-bearings on the lay. When the shuttle presses outward the spring-arm 22, the slide-rod 25 is protruded, so that when the lay beats up the end thereof will encounter the arm 12 on the knock-off lever and operate the latter to stop the loom. By coupling the spring-arm 22, through its beak, to the arm of the elbow-lever the spring 24 may be dispensed with, as the spring-arm itself will then retract the parts as soon as the empty shuttle is removed from the box.

It is desirable in wide looms, where the shuttle requires some time to travel through the shed from one box to the other, and particularly also in looms where the shuttle-boxes do not vibrate with the lay, to provide a mechanism for operating the vibrating parts forming the raceway which will allow the same to dwell or rest during the travel of the shuttle through the shed. In looms as ordinarily constructed the vibration of the lay is effected with cranks, and there being no rest or dwell the lay moves back beyond the picking-point after the picking stroke and comes up again to that point to receive the shuttle. In Fig. 10 we have shown means for producing such a dwell or rest at the picking-point, said means comprising, as a substitute for the ordinary connecting-rods and cranks, a grooved side cam 26 on the ordinary crank-shaft 27 of the loom, said cam having in it a cam-groove which is engaged by a stud-roller 28 on a connecting-rod 29, coupled to the lay-sword $i$ and slotted to embrace the boss of the cam 26. A proper portion 30 of the groove in the cam will be made concentric with the shaft 27, so that during that portion of the rotation of said shaft while the shuttle is traversing the warp-shed the lay will be at rest.

Figs. 1 and 2 do not include means for operating the lay or parts forming the raceway; but it will be understood that the same means will or may be employed as those illustrated in Fig. 10. We do not of course limit ourselves to any specific means for effecting the desired dwell or rest in the to-and-fro motion of the reed or lay, as many ways of effecting this object will suggest themselves to any skilled mechanic. It should be noted that this dwell or rest of the parts which form the raceway is especially useful in a loom where the shuttle or weft-carrier is driven or picked by a compressed aeriform fluid, as this mode of driving the shuttle is especially adapted to quick-running looms, where the to-and-fro motions of the reed are very rapid, as well as those of the shuttle.

By providing the shuttle-box with a transparent cover-plate and the shuttle with an opening in its top the weaver may see the bobbin at intervals and note the condition of the weft thereon; but in a certain class of weaving where great rapidity is essential it is difficult under any circumstances for the weaver to note when the shuttle requires a new supply of weft, and this invention provides for stopping the loom in any case before the weft is entirely exhausted, so that the weaver is not required to note the condition of the weft. When a weft-thread breaks, the usual weft-fork and weft-hammer mechanism found on most looms (and not herein illustrated) will act to stop the loom.

In case of a shuttle having to be driven out of the box $k$ after the loom shall have stopped this may be effected by means of a jet or charge of compressed air from the reservoir $l$ (or other source) through a suitable pipe 31, which forms a by-pass to the pipe $o$ or the shuttle-box about the valves $p$ and $q$. This pipe will be provided with a suitable controlling valve or cock 32.

Our pneumatic device for controlling the times of operation of the loom-stopping mechanism—that is to say, the vent or passage for air in the weft-carrier or shuttle, which is opened by the exhaustion or substantial exhaustion of the weft or filling therein—requires a special form of shuttle box or cell, and this form of box or cell is also adapted for use where compressed air is employed for picking the shuttle, and hence we have shown in the drawings these two features combined; but the pneumatic controlling device is adapted for operation in any loom having a suitable shuttle box or cell wherein the air will be incarcerated by the entry of the shuttle therein. In order that the pneumatic control shall be effective, the shuttle must enter the box somewhat in the manner of a piston in a cylinder. Being the first, as we believe, in this field of invention, we claim, broadly, and would consider as coming within the scope of our invention, a mechanism for stopping the loom, combined with pneumatic means controlling the times of operation of said mechanism, and also such a stopping mechanism combined with means for applying an aeriform fluid to pick or drive the shuttle, and pneumatic means at the shuttle-box for controlling the times of operation of said mechanism.

By exhaustion or substantial exhaustion of the weft or filling in the weft-carrier in play we mean either the entire denudation of the weft-holder or such degree of denudation thereof as will allow the shuttle or weft carrier to perform its functions as described.

By a "shuttle" or "weft-carrier" we mean that which carries the weft or filling or yarn through the warp-shed in the process of weaving, and by "bobbin" or "weft-holder" we mean that device in the shuttle on which is wound the weft or filling. This device or part is variously called a "bobbin," a "spindle," a "cop," &c. Where there is a spindle, the cop or "all cop" will usually be slipped thereon.

In Figs. 1, 2, and 9 we have shown a protection-finger 33 of a known form adapted to operate in connection with the usual coacting mechanism to stop the loom in case a shuttle does not enter the box as it should.

We have shown lateral apertures in the receiving end of the shuttle-box to effect the lateral deflection of the charge of air which picks the shuttle or a portion thereof, so that it may not follow the shuttle into the warps of the loom; but we do not limit ourselves to this particular deflecting means. For example, our pending application, Serial No. 9,842, filed March 23, 1900, illustrates another deflecting means.

Having thus described our invention, we claim—

1. In a loom, the combination with a loom-stopping mechanism, a going or vibrating part of the loom, and an intermediate mechanism between the stopping mechanism and said going part, of a shuttle-box, a shuttle having an air-passage through it which is normally closed by the weft, means for applying to said shuttle an aeriform fluid for picking or driving it, and means extending into the shuttle-box and connected with said intermediate mechanism, whereby when the exhaustion of the weft opens said passage through the shuttle the latter is permitted to actuate the said intermediate mechanism to stop the loom.

2. In a loom, the combination with a loom-stopping mechanism, a going or vibrating part of the loom, and an intermediate mechanism between the stopping mechanism and said going part, of a shuttle-box, a shuttle having an air-passage through it which is normally closed by the weft, and a valve which permits the air to flow in one direction only through said passage, means for applying to said shuttle an aeriform fluid for picking or driving it, and means extending into the shuttle-box and connected with said intermediate mechanism, whereby when the exhaustion of the weft opens said passage through the shuttle the latter is permitted to actuate the said intermediate mechanism to stop the loom.

3. In a loom, the combination with a loom-stopping mechanism, a going or vibrating part of the loom, and an intermediate mechanism between the stopping mechanism and said going part, said intermediate mechanism comprising the swing-rod 11, and lever 10, a shuttle-box, having mounted in its outer end the slide-rod 8, coupled to the lever 10, a shuttle having an air-passage through it which is normally closed by the weft, means for applying to said shuttle an aeriform fluid for picking or driving it, and means extending into the shuttle-box and connected with said intermediate mechanism, whereby when the exhaustion of the weft opens said passage through the shuttle the latter is permitted to actuate the said intermediate mechanism to stop the loom.

4. In a loom, the combination with a vibrating or going part, a stopping mechanism, and an intermediate mechanism between said stopping mechanism and going part and adapted for operatively connecting the same at proper times, of a shuttle-box, means for admitting thereto an aeriform fluid for picking or driving the shuttle, the said shuttle, having a passage through it for air, a bobbin or weft-holder having in it an aperture normally closed by the weft thereon, and means extending into the path of the shuttle in the shuttle-box and connecting with the said intermediate mechanism, whereby the shuttle is adapted to operate the latter when the weft is nearly exhausted.

5. In a loom, the combination with a shuttle-box, and means for introducing an aeriform fluid under tension thereto for picking or driving the shuttle or weft-carrier, of auxiliary means for introducing said fluid to said shuttle-box for displacing the shuttle, whereby the shuttle may be displaced when the beating-up portion of the loom is not running.

6. In a loom, the combination with a shuttle-box, and means for introducing an aeriform fluid under tension thereto for picking or driving the shuttle, of an auxiliary pipe for leading the compressed fluid to said box, and a valve or cock in and controlling said pipe, whereby the operator may displace the shuttle with a jet at will.

7. In a loom, the combination with means for picking or driving the shuttle with compressed air, of the shuttle, having a passage through it for air, and a bobbin, having in it an aperture for air which is normally closed by the weft on the bobbin, and a flat spring 17, which closes said aperture when overwrapped by the weft, whereby the said passage is opened when the spring 17 is relieved by the exhaustion of the weft.

8. The combination with a shuttle having an air-passage through it, of a bobbin which fits in said shuttle and is provided with an aperture 16, and a spring-closer 17, which tends by its own resiliency to spring outward and leave said aperture open.

9. The combination with a shuttle-box of tubular form adapted to incarcerate air in front of the incoming shuttle, and having a hermetically-closable cover at its top, of a shuttle adapted to fit piston-like into said box, means for admitting a compressed aeriform fluid thereto for picking the shuttle, and means, governed by the presence or absence of weft or filling in the shuttle controlling the extent to which the shuttle enters the shuttle-box.

10. The combination with a shuttle-box of tubular form, adapted to incarcerate air in front of the incoming shuttle and having a hermetically-closable, hinged cover, and means for admitting a charge of compressed air thereto for picking or driving the shuttle, of the said shuttle adapted to fit piston-like in said box and having means controlled by the presence or absence of weft or filling therein for modifying the tension of the air incarcerated in the box.

11. A cylindrical shuttle or weft-carrier, provided with ballast at the bottom, and having a passage through it for air, which passage is closed by the weft or filling therein.

12. A cylindrical shuttle or weft-carrier, provided with ballast at the bottom, having a passage through it for air, which passage is closed by the weft or filling therein, and a valve to prevent the flow of air through said shuttle in one direction.

13. A loom having the following instrumentalities, namely: a weft-carrier or shuttle, a shuttle-box, means for applying an aeriform fluid to pick or drive said weft-carrier, the latter having an air passage or vent which is normally closed by the weft and adapted to be opened by the substantial exhaustion of the weft, thereby allowing said shuttle to set in motion mechanism for stopping the loom, and said loom-stopping mechanism.

14. A loom having the following instrumentalities, namely: a weft-carrier or shuttle, a shuttle-box, means for applying an aeriform fluid to pick or drive said weft-carrier, the latter having an air passage or vent which is normally closed by the weft and adapted to be opened by the substantial exhaustion of the weft, thereby allowing said shuttle to set in motion mechanism for stopping the loom, said loom-stopping mechanism, and means for arresting the reciprocating portions of the loom at the time of picking the shuttle.

15. In a loom, the combination with a loom-stopping mechanism, of means for controlling the times of operation of said stopping mechanism, said means comprising a weft-carrier having an air passage or vent, which passage is normally closed by the weft or filling in said carrier and opened by the substantial exhaustion of said weft or filling.

16. In a loom, the combination with a loom-stopping mechanism, of means for controlling the times of operation of said stopping mechanism, said means comprising a weft-carrier having a bobbin or weft-holder within it, the weft or filling on said bobbin normally closing a vent or passage within the weft-carrier, which passage is opened by the substantial exhaustion of the weft or filling on said holder.

17. In a loom, the combination with a loom-stopping mechanism, of means for controlling the times of operation of said stopping mechanism, said means comprising a weft-carrier having an air passage or vent, which passage is normally closed by the weft or filling in said carrier and opened by the substantial exhaustion of said weft or filling, and means for arresting the movement of the beating-up portion of the loom at about the time the weft-carrier is traversing the warp-shed.

18. In a loom, the combination with a loom-stopping mechanism, a shuttle-box, and coöperating connecting mechanism between said box and the mechanism for stopping the loom, of means for controlling the times of operation of said stopping mechanism, said means comprising a weft-carrier having an air passage or vent, which passage is normally closed by the weft or filling in said carrier and opened by the substantial exhaustion of said weft or filling.

19. In a loom, the combination with a loom-stopping mechanism, a shuttle-box, and means extending therefrom to coöperate and connect with the mechanism for stopping the loom, of means for controlling the times of operation of said stopping mechanism, said means comprising a weft-carrier having an air passage or vent, which passage is normally closed by the weft or filling in said carrier and opened by the substantial exhaustion of said weft or filling.

20. In a loom, the combination with a loom-stopping mechanism, a shuttle-box, and means extending into the latter for coöperation with the said stopping mechanism, of a shuttle or weft-carrier adapted to impinge upon said means within the box for stopping the loom when the weft or filling in the shuttle is nearly or quite exhausted, said shuttle having within it an air passage or vent which is normally closed by the weft or filling therein, and which is opened by the substantial exhaustion of said weft or filling.

21. In a loom, the combination with a loom-stopping mechanism, of a tubular, laterally-closed shuttle-box adapted for incarcerating air, mechanism extending into said box and adapted to coöperate with the loom-stopping mechanism when impinged upon by the entering weft-carrier, and a piston-like weft-carrier having extending through it an air-passage which is normally closed by the weft or filling in the carrier and opened by the partial exhaustion of said weft or filling so that the tension of the air-cushion in the box is relieved.

22. In a loom, the combination with a loom-stopping mechanism, a going or vibrating part of the loom, and an intermediate mechanism between the stopping mechanism and said going part, of a shuttle-box, a shuttle having an air-passage through it which is normally closed by the weft, and means extending into the shuttle-box and connected with said intermediate mechanism, whereby when the exhaustion of the weft opens said passage through the shuttle the latter is permitted to actuate the said intermediate mechanism to stop the loom.

23. In a loom, the combination with a loom-stopping mechanism, a going or vibrating part of the loom, and an intermediate mechanism between the stopping mechanism and said going part, of a shuttle-box, a shuttle having an air-passage through it which is normally closed by the weft, and a valve which permits the air to flow in one direction only through said passage, and means extending into the shuttle-box and connected with said intermediate mechanism, whereby when the exhaustion of the weft opens said passage through the shuttle the latter is permitted to actuate the said intermediate mechanism to stop the loom.

24. In a loom, the combination with a vibrating or going part, a stopping mechanism, and an intermediate mechanism between said stopping mechanism and going part and adapted for operatively connecting the same at proper times, of a shuttle-box, a bobbin or weft-holder having in it an aperture normally closed by the weft thereon, and means extending into the path of the shuttle in the shuttle-box and connecting with the said intermediate mechanism, whereby the shuttle is adapted to operate the latter when the weft is nearly exhausted.

25. In a loom, the combination with a loom-stopping mechanism, a vibratively-mounted reed, a shuttle box or cell, means for imparting movement to said reed, and means for arresting the movement of the reed while the shuttle is traversing the warp-shed, of means for controlling the times of operation of said stopping mechanism, said means comprising a weft-carrier or shuttle having in it a vent or air-passage which is normally closed by the weft or filling in said carrier and opened by the substantial exhaustion of said weft or filling.

26. In a loom, the combination with a loom-stopping mechanism, a vibratively-mounted reed, a shuttle box or cell, and means for imparting movement to said reed, of means for controlling the times of operation of said stopping mechanism, said means comprising a weft-carrier or shuttle having in it a vent or air-passage which is normally closed by the weft or filling in said carrier and opened by the substantial exhaustion of said weft or filling.

27. In a loom, the combination with a shuttle box or cell capable of incarcerating air in front of the incoming shuttle, and the shuttle, having through it a passage for air, of a bobbin, having in it an aperture for air which is normally closed by the weft on the bobbin, and having a flat spring 17, which closes said aperture when overwrapped by the weft, said spring being adapted, when relieved, to spring outward and open said aperture.

28. In a loom, the combination with a loom-stopping mechanism, a shuttle-box, and an intermediate mechanism between said stopping mechanism and box for setting the former in operation at proper times, of a weft-carrier or shuttle adapted to act by impact on said intermediate mechanism when it enters said box to the proper extent, and means, governed by the presence or absence of weft or filling in the carrier, which controls the extent of entry of the latter into its box.

29. In a loom, the combination with a weft-carrier or shuttle, means for picking or driving said shuttle, a shuttle-box, and a loom-stopping mechanism, of intermediate mechanism between said stopping mechanism and shuttle-box and extending into the path within the box of the body of an incoming substantially-exhausted shuttle, whereby the impact of the shuttle-body directly upon the said intermediate mechanism operates to stop the loom.

In witness whereof we have hereunto signed our names, this 25th day of August, 1899, in the presence of two subscribing witnesses.

WILLIAM H. BAKER.
FREDERIC E. KIP.

Witnesses:
CLAUDE J. FARNSWORTH,
PETER A. ROSS.